(12) United States Patent
Sugano et al.

(10) Patent No.: US 7,413,098 B2
(45) Date of Patent: Aug. 19, 2008

(54) INTERNAL PRESSURE CONTAINER AND ITS MANUFACTURING METHOD

(75) Inventors: Yoshihiko Sugano, Joetsu (JP); Yuichi Kawai, Joetsu (JP); Hiroshi Tanaka, Joetsu (JP)

(73) Assignee: Arisawa Mfg. Co., Ltd., Niigata (JP)

( * ) Notice: Subject to any disclaimer, the term of this patent is extended or adjusted under 35 U.S.C. 154(b) by 467 days.

(21) Appl. No.: 11/143,567

(22) Filed: Jun. 3, 2005

(65) Prior Publication Data
US 2006/0000543 A1    Jan. 5, 2006

(30) Foreign Application Priority Data
Jun. 30, 2004    (JP) .............................. 2004-194903

(51) Int. Cl.
*B65H 81/00*    (2006.01)
(52) U.S. Cl. .................. 220/590; 156/172; 156/169; 428/34.7; 428/36.3; 220/588; 220/589
(58) Field of Classification Search ................ 156/169, 156/172, 173, 175; 220/588, 589, 590; 428/34.7, 428/36.3
See application file for complete search history.

(56) References Cited

U.S. PATENT DOCUMENTS

| | | | | |
|---|---|---|---|---|
| 3,881,973 A | * | 5/1975 | Pinckney ..................... 156/86 |
| 4,187,135 A | * | 2/1980 | Yates et al. .................. 156/187 |
| 4,236,386 A | * | 12/1980 | Yates et al. .................. 464/181 |
| 4,260,332 A | * | 4/1981 | Weingart et al. ............ 416/226 |
| 4,649,960 A | * | 3/1987 | Policelli ..................... 138/109 |
| 5,160,392 A | * | 11/1992 | Thongs, Jr. .................. 156/172 |
| 6,379,763 B1 | * | 4/2002 | Fillman ..................... 428/36.9 |

* cited by examiner

Primary Examiner—Jeff H Aftergut
(74) Attorney, Agent, or Firm—Sughrue Mion, PLLC

(57) ABSTRACT

To provide a fiber reinforced resin sleeve that is superior in mechanical strength in low cost and easily without enlarging the sleeve and increasing the weight of the sleeve, a method for manufacturing an internal pressure container in which both end portions of a fiber reinforced resin sleeve 1 formed by continuously winding a fiber in a filament winding method with both ends having larger diameters are closed by closure lids 2, and the closure lids 2 are supported by retainer rings 3 coupled to the sleeve 1, comprising the following steps of: continuously winding the fiber, impregnated with the resin, on a mandrel substantially in a perpendicular direction to an axial direction of the mandrel to form a first layer F; setting the first layer F so that a distal end is located in a position at a predetermined position L from an end of the sleeve 1 and a proximal end is located in a position inside of the closure lid 2 and the retainer ring 3; subsequently continuously winding the fiber on the first layer F at an acute angle to the axial direction of the mandrel to form a second layer S over an entire range of the sleeve 1; subsequently continuously winding the fiber on the second layer S substantially in the perpendicular direction to the axial direction of the mandrel to form a third layer T wound only on the end portion of the sleeve 1; and after curing the resin, providing the closure lid 2 and the retainer ring 3 to the sleeve 1 formed by removing the mandrel away.

15 Claims, 2 Drawing Sheets

INTERNAL PRESSURE CONTAINER AND ITS MANUFACTURING METHOD

BACKGROUND OF THE INVENTION

1. Field of the Invention

The present invention relates to an internal pressure container and its manufacturing method.

2. Related Art

An internal pressure container in which a fiber reinforced resin made sleeve 20 produced by winding a continuous fiber by a filament winding method is closed at both ends by closure lids 21 and the closure lids 21 are supported by retainer rings 22 coupled with the sleeve 20 is used in, for example, a seawater purifying apparatus as shown in FIG. 1. An end portion B of the above-described sleeve 20 is large in diameter in comparison with the other end portion A thereof.

The reason why the above-described sleeve 20 has such a configuration, it may receive well an internal pressure applied to the closure lid 21 of the end portion B of the sleeve 20 and the retainer ring 22 thereof. (Since the retainer ring 22 is embedded in the sleeve 20, the thickness of the end portion B is increased.)

More specifically, in order to give a desired thickness to a portion to become the end portion B of the above-described sleeve 20 by winding a fiber around a mandrel, the above-described fiber is continuously wound by a hoop winding substantially at 90 degrees to an axis of the mandrel. Thereafter, the above-described fiber is continuously wound over the entire range of the mandrel substantially at a uniform thickness by a helical winding substantially at 55 degrees to the axis of the mandrel. Incidentally, a desired mechanical strength may be attained by the helical winding.

However, in the case where the above-described sleeve 20 is formed as described above, an interface between a layer X wound and laminated by the above-described hoop winding and a layer Y wound and laminated by the above-described helical winding is in parallel with an axial load due to the inner pressure in cross-section as shown in FIG. 2. When the internal pressure is applied thereto, a peel occurs between the layers. Thus, there is a problem that the closure lid 21 falls away.

In a durable internal mechanical strength is set at 400 kg/cm$^2$ or more, such a problem may be solved, for example, by setting the thickness of the end portion B of the sleeve 20 (in general, 40 mm or more) or setting a distance from the closure lid 21 to the end portion B (in general, 150 mm or more). However, these countermeasures lead to a large-size problem or a high cost problem disadvantageously.

In particular, if the thickness of the end portion is more than 40 mm, an interval between a plurality of internal pressure containers to be juxtaposed with each other in forming the seawater purifying apparatus is increased, so that the size of the apparatus is enlarged. On the other hand, if the length from the end portion to the retainer ring exceeds 150 mm, mounting and dismounting of bolts would be troublesome when the retainer rings are removed for mounting a reverse permeation membrane that is needed to the seawater purifying apparatus.

Also, it is proposed to make a structure in which an inner ring to receive the internal pressure applied to the retainer ring. However, in this case, the inner ring has to be installed internally and at the same time, an integral molding has to be performed. Accordingly, the filament winding must be done to be in compliance with such complicated steps.

SUMMARY OF THE INVENTION

In order to overcome the above-noted defects, an object of the present invention is to provide an internal pressure container and its manufacturing method that may aim to enhance a mechanical strength in low cost and easily without enlarging a size of a fiber reinforced resin sleeve or increasing a weight thereof.

An essence of the present invention will now be described with reference to the accompanying drawings.

According to the present invention, there is provided a method for manufacturing an internal pressure container in which both end portions of a fiber reinforced resin sleeve 1 formed by continuously winding a fiber in a filament winding method with both ends having larger diameters are closed by closure lids 2, and the closure lids 2 are supported by retainer rings 3 coupled to the sleeve 1, comprising the following steps of:

continuously winding the fiber, impregnated with the resin, on a mandrel substantially in a perpendicular direction to an axial direction of the mandrel to form a first layer F;

setting the first layer F so that a distal end is located in a position at a predetermined position L from an end of the sleeve 1 and a proximal end is located in a position inside of the closure lid 2 and the retainer ring 3;

subsequently continuously winding the fiber on the first layer F at an acute angle to the axial direction of the mandrel to form a second layer S over an entire range of the sleeve 1;

subsequently continuously winding the fiber on the second layer S substantially in the perpendicular direction to the axial direction of the mandrel to form a third layer T wound only on the end portion of the sleeve 1; and after curing the resin, providing the closure lid 2 and the retainer ring 3 to the sleeve 1 formed by removing the mandrel away.

In the method for manufacturing the internal pressure container according to a second aspect in the first aspect, a thickness of both end portions of the sleeve 1 is set at 35 mm or less, respectively.

In the method for manufacturing the internal pressure container according to a third aspect in the first aspect, a length from the ends of the sleeve 1 to the retainer rings 3 is 150 mm or less, respectively.

In the method for manufacturing the internal pressure container according to a fourth aspect in the second aspect, a length from the ends of the sleeve 1 to the retainer rings 3 is 150 mm or less, respectively.

In the method for manufacturing the internal pressure container according to a fifth aspect in any one of the first to fourth aspects, a durable internal pressure mechanical strength is at 400 kg/cm$^2$ or more.

According to a sixth aspect of the invention, there is provided an internal pressure container in which both end portions of a fiber reinforced resin sleeve 1 formed by continuously winding a fiber in a filament winding method with both ends having larger diameters are closed by closure lids 2, and the closure lids 2 are supported by retainer rings 3 coupled to the sleeve 1, comprising first layers F formed at positions where the closure lids 2 and the retainer rings 3 are located; a second layer S laminated on the first layers F to conceal the first layers F and extending to the both end portions of the sleeve 1; and third layers T laminated on the second layer S and provided on both end portions of the second layer S.

According to the present invention, as described above, it is possible to provide an internal pressure container and a method for producing the internal pressure container that is superior in practical use and that may readily enhance the mechanical strength in low cost without leading to the increase in weight.

A preferred mode for embodying the invention will now be described briefly with the effects of the invention.

The first layer F is set so that the distal end is located in the position at the predetermined distance L from the end portion of the fiber reinforced resin sleeve 1 and the proximal end is located in the position at the predetermined distance M inside the closure lid 2 and the retainer ring 3, and the second layer S is formed on the first layer F and over the entire range of the above-described sleeve 1. Accordingly, the second layer S is adapted to conceal the tip end portion of the first layer F and the interface between the first layer F and the second layer S is not in parallel with the axial load due to the internal pressure so that the outward pressure applied to the closure lid 2 and the retainer ring 3 provided in the first layer F is well supported.

In addition, since the third layer T is wound only around the end portion of the second layer S, the end portion of the second layer S is fastened to thereby make it possible to prevent the second layer S from expanding so that the above-described outward pressure may be supported well.

Accordingly, it is possible to obtain a fiber reinforced resin sleeve 1 that is superior in mechanical strength and in which a peel between the layers hardly occurs between the first layer F and the second layer S without enlarging the sleeve 1 and increasing the weight of the sleeve 1.

DESCRIPTION OF THE PREFERRED EMBODIMENTS

Figure 1:
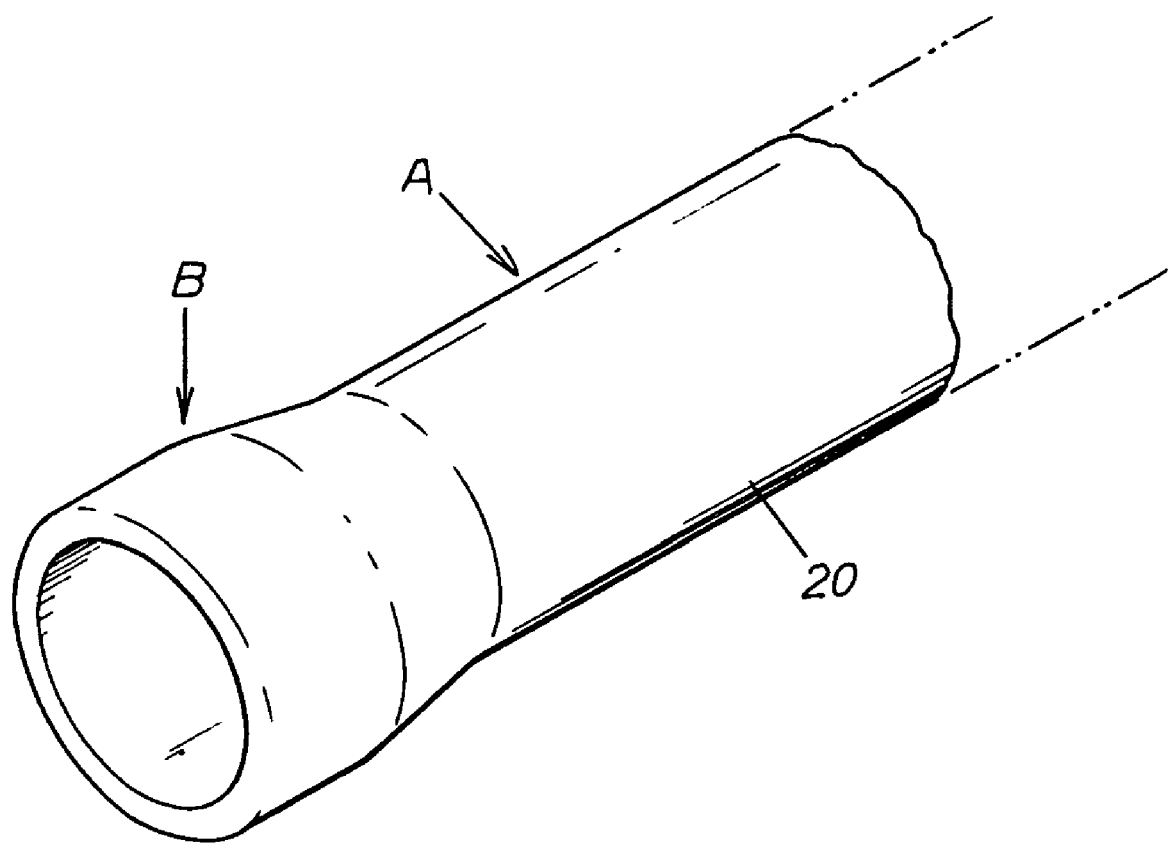
FIG. 1 is a schematic illustrative perspective view of a conventional case.

A specific embodiment of the invention will now be described with reference to FIG. 3.

This embodiment is directed to a method for manufacturing an internal pressure container in which a continuous fiber is wound by a filament winding method so that both end portions of a fiber reinforced resin sleeve 1 having larger diameters at end portion sides are closed by closure lids 2, and the closure lids 2 are supported to retainer rings 3 coupled with the above-described sleeve 1. The fiber impregnated with resin is wound continuously around a mandrel substantially in a perpendicular direction to an axial direction of the mandrel to form a first layer F. This first layer F is set so that a distal end portion is positioned at a predetermined distance L from an end of the above-described sleeve 1 and a proximal end is positioned at a predetermined position M inside the closure lid 2 and the retainer ring 3. Subsequently, the above-described fiber is wound continuously on the above-described first layer F at an acute angle to the axial direction of the mandrel to form a second layer S. The second layer S is formed on the overall range of the above-described sleeve 1. The fiber is wound directly around the mandrel except for the portion where the first layer F is provided. Subsequently, the above-described fiber is wound continuously on the second layer S substantially in the perpendicular direction to the axial direction of the mandrel to form a third layer T. The third layer T is set to be wound only around the end portion of the above-described sleeve 1. Subsequently, after curing of the resin, the closure lid 2 and the retainer ring 3 are provided to the above-described sleeve 1 from which the mandrel is removed.

More specifically, the internal pressure container according to this embodiment will be manufactured by using a well known filament winding method as follows.

A necessary amount of glass fiber impregnated with epoxy resin is wound continuously substantially in the perpendicular direction to the axial direction of the mandrel (i.e., at 90 degrees to the axial direction of the mandrel) to form the first layer F.

More specifically, the first layer F is set so that its distal end portion is located at a predetermined distance L from an end of the sleeve 1 and its proximal end is located at a predetermined distance M inside the closure lid 2 and the retainer ring 3. The winding mounts at both end portions of the firs layer F are decreased gradually so that both end portions are formed to be tapered as shown in FIG. 3.

The above-described closure lid 2 and the retainer ring 3 are provided to the first layer F.

Subsequently, a necessary amount of the above-described fiber is wound continuously on the first layer F at an acute angle (about 55 degrees) to the axial direction of the mandrel to form a second layer S.

More specifically, the second layer is formed to have a uniform thickness over the entire range of the above-described sleeve 1 (with the winding amount thereof being kept equal over the entire range) and is set so as to be wound directly on the mandrel except for the portion where the first layer F is provided.

Accordingly, the second layer S is bent at the front and back sides of the first layer F (at the front and back sides of the retainer ring 3 which is to receive the axial load) to conceal (to embrace) the inner end portion and the outer end portion of the first layer F to prevent the first layer F from moving in the axial direction.

Namely, the second layer S is bent at both ends to conceal the end portions of the above-described first layer F by the second layer S so that, even if the internal pressure is applied to the closure lid 2 and the retainer ring 3 provided to the first layer F, the interface between the first layer F and the second layer S is not in parallel with the axial load due to the internal pressure and the peel between the layers hardly occurs.

Subsequently, the above-described fiber is wound continuously on the second layer S to form a third layer T. More specifically, the third layer T is set to be wound only on both end portions of the above-described second layer S (at a portion closing the outer end portion of the first layer F) and to be wound substantially flush with an outer circumference of the second layer S.

The portion of the second layer S for concealing the end portion of the first layer F (the portion from the end of the sleeve up to the distance L) is fastened by the third layer T like a so-called fastening ring of a barrel whereby the end portion of the above-described second layer S is to be expanded due to the above-described internal pressure (while the diameter is increasing), the expansion of the second layer S is positively prevented to thereby provide a structure that is superior in mechanical strength without occurring the peel between the layers at all.

Figure 2:
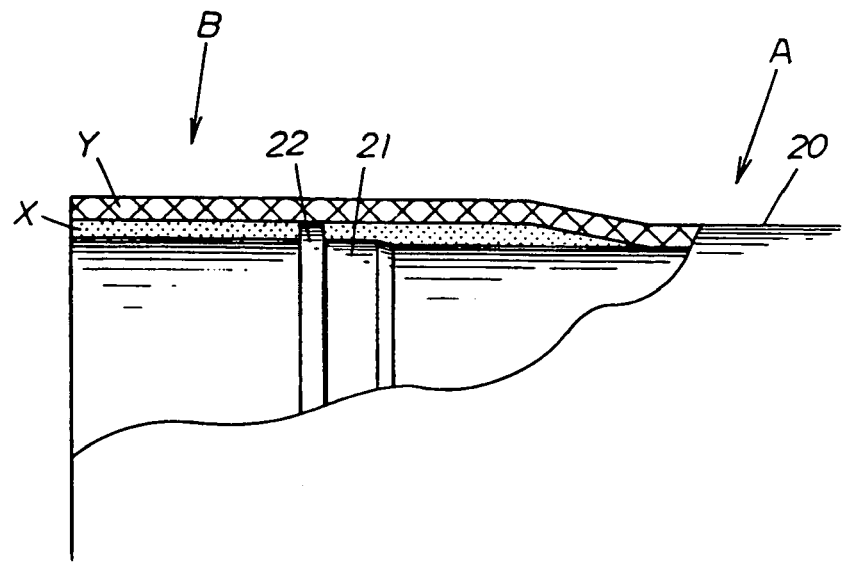
FIG. 2 is a schematic sectional view of the conventional case.

Namely, in the conventional case as shown in FIG. 2, the resistance against the axial load due to the internal pressure is only the adhesive force of the resin in the interface between the layer X formed by hoop winding and the layer Y formed by helical winding but according to this embodiment, not only the adhesive force of the resin in the interface between the first layer F and the second layer S against the above-described axial load but also a shearing strength of the fiber of the first layer F, the second layer S and the third layer T may contribute to the resistance to thereby make it possible to realize a good durable internal pressure strength.

Accordingly, in accordance with this embodiment, it is possible to provide a structure in which the peel between the first layer F and the second flayer S is hardly generated even if the diameter of the end portion of the sleeve 1 would not be further increased. Accordingly, it is possible to set the thickness of the end portion having a larger diameter than that of the barrel portion of the sleeve 1 to a minimum level to thereby make it possible to avoid the enlargement or the increase in weight to provide a structure that is superior in workability and cost-performance.

Subsequently, the above-described epoxy resin is heated and cured. Subsequently, the mandrel is removed away to form the fiber reinforced resin sleeve 1.

Subsequently, the closure lid 2 and the retainer ring 3 are provided to the first layer F of the fiber reinforced resin sleeve 1 to close the sleeve 1.

More specifically, a retainer groove 4 having a taper surface 4a retained to a taper portion 2a provided around an outer circumferential surface of the closure lid 2 by cutting is formed at a mounting position of the above-described closure lid 2 of the first layer F of the above-described sleeve 1. Also, a concave groove 5 on which the retainer ring 3 is to be mounted is formed at the mounting position of the retainer ring 3 by cutting.

Incidentally, it is possible to form the retainer groove 4 and the recess groove 5 simultaneously with winding the above-described fiber around the above-described sleeve 1 without depending upon the above-described cutting work. In this case, it is possible to close the sleeve 1 without cutting the above-described fiber to make it possible to provide a sleeve 1 that is much more superior in mechanical strength.

Subsequently, the closure lid 2 is inserted into the above-described sleeve 1 until the above-described tapered portion 2a is engaged with the tapered surface 4a of the retainer groove 4. Subsequently, the three-divided retainer ring 3 is fitted in the recess groove 5 so as to support the closure lid 2 retained and positioned in the above-described sleeve 1 by the above-described retainer groove 4 to support the closure lid 2 to form the internal pressure container. This retainer ring 3 is fixed to the closure lid 2 by a suitable means such as bolts or the like.

Incidentally, in this embodiment, the three-divided retainer ring is used as the retainer ring 3. However, it is possible to use a retainer ring 3 having any other structure such as a halved structure or the like.

Figure 3:
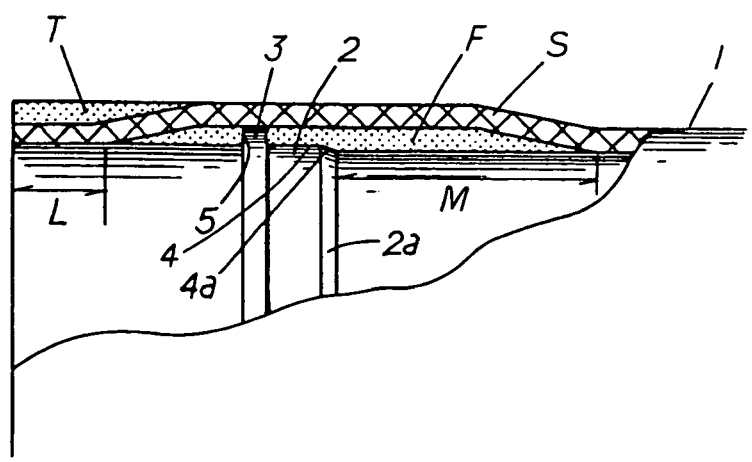
FIG. 3 is a schematic sectional view of a container according to an embodiment of the invention.

The durable internal pressure mechanical strength of the type of this embodiment as shown in FIG. 3 was compared with that of the conventional type as shown in FIG. 2 while the thickness and the inner diameter of the end portions of the sleeves being kept constant. In this case, it was confirmed that the mechanical strength of the conventional type was 333 kg/cm² whereas the mechanical strength of the type of this embodiment was 404 kg/cm² even if the thickness and the inner diameter were kept constant, and thus the mechanical strength was enhanced by about 21%.

More specifically, the inner pressure container according to this embodiment had the outer diameter of both end portions: Ø294 mm, the inner diameter: Ø243 mm, the outer diameter of the sleeve: Ø274 mm, the inner diameter: Ø240 mm, the maximum thickness of the both end portions: 27 mm, the thickness of the sleeve portion: 17 mm, and the length from the end portion to the retainer ring: 113.5 mm.

Incidentally, in the case where the durable internal mechanical strength of 400 kg/cm² is attained by the conventional type, it is necessary to increase the thickness (maximum thickness of both end portions) to 40 mm or more or the length from the end portion to the retainer ring to 150 mm or more.

Namely, in the inner pressure container having the durable internal mechanical strength of 400 kg/cm² level (design pressure: 70 kg/cm² and safety rate 5 level) according to this embodiment, since the end portion may be thinned (to about 35 mm or less), for example, when a plant is constructed for purifying seawater, it is possible to narrow an interval between the containers to thereby make it possible to enhance a density of the plants and miniaturize the plants.

Also, since the length from the retainer ring 3 to the end of the container may be less than 150 mm or less (113.5 mm in the above-described case), for example, when reverse permeation membranes are to be replaced or the like, in removing the retainer rings 3, it is possible to readily fasten or remove bolts or the like.

Furthermore, since the above-described durable internal mechanical pressure may be realized without embedding the inner ring, receiving the internal pressure to the retainer ring 3, to the sleeve, it is unnecessary to use the inner ring and to form the complicated filament winding.

As described above, according to the present invention, the first layer F is set so that the distal end is located in the position at the predetermined distance L from the end portion of the fiber reinforced resin sleeve 1 and the proximal end is located in the position at the predetermined distance M inside the closure lid 2 and the retainer ring 3, and the second layer S is formed over the entire range of the above-described sleeve 1. Accordingly, the second layer S is adapted to conceal the tip end portion of the first layer F and the interface between the first layer F and the second layer S is not in parallel with the axial load due to the internal pressure so that the outward pressure applied to the closure lid 2 and the retainer ring 3 provided in the first layer F is well supported.

In addition, since the third layer T is wound only around the end portion of the second layer S, the end portion of the second layer S is fastened to thereby make it possible to prevent the second layer S from expanding so that the above-described outward pressure may be supported well.

Also, since the end portion may be thinned specifically down to about 35 mm, for example, when a plant for purifying seawater is built, the interval between the containers may be narrowed more than that of the conventional case and it is possible to obtain the above-described sleeve 1 that may be arranged at a high density and in a small size.

Also, since the length from the retainer ring to the end of the container may be at 150 mm or less, for example, when the retainer ring is to be removed away in the case where the reverse permeation membranes are to be replaced for purifying the seawater, it is possible to readily perform the removal of the bolts or the like and fastening the bolts to thereby provide the sleeve 1 that is much more superior in workability.

Also, since the inner ring may be dispensed with, it is unnecessary to use the complicated winding formation so that the productivity is enhanced.

Accordingly, in accordance with this embodiment, it is possible to provide the method for producing the internal pressure container that is superior in practical use and that may readily enhance the mechanical strength in low cost without leading to the enlargement and the increase in weight of the sleeve 1.

What is claimed is:

1. An internal pressure container in which both end portions of a fiber reinforced resin sleeve are formed by continuously winding a fiber in a filament winding method with both ends having larger diameters, wherein the both ends are closed by closure lids, and the closure lids are supported by retainer rings coupled to the sleeve, comprising:

a first layer disposed at positions where the closure lids and the retainer rings are located, wherein the first layer is disposed such that a distal end of the first layer is located at a position that is away from an end of the sleeve by a first distance;

a second layer disposed on the first layers to conceal the first layer and extending to the both end portions of the sleeve; and a third layer disposed on the second layer and provided on both end portions of the second layer.

2. The internal pressure container according to claim 1, wherein a thickness of the both end portions of the sleeve is set at 35 mm or less, respectively.

3. The internal pressure container according to claim 1, further comprising:

a first end that closes a first end portion of the sleeve among the both end portions; and a second end that closes a second end portion of the sleeve among the both end portions, wherein the first closure Lid and the second closure lid are supported by a first retainer ring and a second retainer ring, respectively, and wherein a length from the first end and second end of the sleeve to the first retainer ring and the second retainer ring is 150 mm or less, respectively.

4. The internal pressure container according to claim 2, further comprising:

a first end that closes a first end portion of the sleeve among the both end portions; and a second end that closes a second end portion of the sleeve among the both end portions, wherein the first closure lid and the second closure lid are supported by a first retainer ring and a second retainer ring, respectively, and wherein a length from the first end and second end of the sleeve to the first retainer ring and the second retainer ring is 150 mm or less, respectively.

5. The internal pressure container according to claim 1, wherein a durable internal pressure mechanical strength of the internal pressure container is 400 kg/cm$^2$ or more.

6. The internal pressure container according to claim 1, wherein the second layer is disposed such that a tip of the distal end of the first layer is concealed.

7. The internal pressure container according to claim 6, wherein the second layer is disposed directly on the sleeve except for the portion where the first layer is disposed on the sleeve.

8. A method of manufacturing an internal pressure container in which both end portions of a fiber reinforced resin sleeve are formed by continuously winding a fiber in a filament winding method with the both end portions having larger diameters, wherein the both ends portions are closed by at least one closure lid, and the at least one closure lid is supported by at least one retainer ring coupled to the sleeve, the method comprising:

continuously winding the fiber, impregnated with the resin, on a mandrel substantially in a perpendicular direction to an axial direction of the mandrel to form a first layer;

setting the first layer such that a distal end of the first layer is located in a position at a predetermined position from an end of the sleeve and a proximal end of the first layer is located in a position inside of the at least one closure lid and the at least one retainer ring;

subsequently continuously winding the fiber on the first layer at an acute angle to the axial direction of the mandrel to form a second layer over an entire range of the sleeve;

subsequently continuously winding the fiber on the second layer substantially in the perpendicular direction to the axial direction of the mandrel to form a third layer wound only on the end portion of the sleeve; and after curing the resin, providing the at least one closure lid and the at least one retainer ring to the sleeve formed by removing the mandrel away.

9. The method of manufacturing the internal pressure container according to claim 8, wherein a thickness of both end portions of the sleeve is set at 35 mm or less, respectively.

10. The method of manufacturing the internal pressure container according to claim 8, wherein the both end portions are closed by a first closure lid and a second closure lid, respectively, and the first closure lid and the second closure lid are supported by a first retainer ring and a second retainer ring, respectively, wherein a length from the ends of the sleeve to the first retainer ring and the second retainer ring is 150 mm or less, respectively.

11. The method of manufacturing the internal pressure container according to claim 9, wherein the both end portions are closed by a first closure lid and a second closure lid, respectively, and the first closure lid and the second closure lid are supported by a first retainer ring and a second retainer ring, respectively, wherein a length from the ends of the sleeve to the first retainer ring and the second retainer ring is 150 mm or less, respectively.

12. The method of manufacturing the internal pressure container according to any one of claims 8 to 11, wherein a durable internal pressure mechanical strength is at 400 kg/cm$^2$ or more.

13. The method of manufacturing the internal pressure container according to claim 8, wherein the second layer is formed such that a tip of the distal end of the first layer is concealed.

14. The method of manufacturing the internal pressure container according to claim 13, wherein the continuously winding the fiber to form the first layer comprises winding mounts at both end portions of the firs layer which are decreased gradually so that both end portions are formed to be tapered.

15. The method of manufacturing the internal pressure container according to claim 13, wherein the subsequently continuously winding the fiber to form the second layer comprises winding the fiber directly on the mandrel except for the portion where the first layer is provided.

* * * * *